United States Patent
Ito

(10) Patent No.: US 7,784,978 B2
(45) Date of Patent: Aug. 31, 2010

(54) SURFACE LIGHT SOURCE DEVICE AND LCD UNIT

(75) Inventor: Takahiro Ito, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 211 days.

(21) Appl. No.: 12/048,902

(22) Filed: Mar. 14, 2008

(65) Prior Publication Data

US 2008/0225522 A1  Sep. 18, 2008

(30) Foreign Application Priority Data

Mar. 15, 2007 (JP) ............................. 2007-067585

(51) Int. Cl.
  *F21V 5/00* (2006.01)
(52) U.S. Cl. ...................... 362/330; 362/225; 362/97.2; 362/614; 362/628
(58) Field of Classification Search .................. 362/247, 362/225, 330, 97.1–97.4, 222–224, 244–246, 362/613, 614, 616, 628; 349/70, 62, 63
  See application file for complete search history.

(56) References Cited

U.S. PATENT DOCUMENTS 6,883,950 B2 * 4/2005 Adachi et al. ............... 362/225

2005/0259195 A1  11/2005 Koganezawa

FOREIGN PATENT DOCUMENTS

| EP | 1780461 | 5/2007 |
| JP | 2005339822 | 12/2005 |
| JP | 2006058481 | 3/2006 |

* cited by examiner

*Primary Examiner*—Bao Q Truong
(74) *Attorney, Agent, or Firm*—Kenealy Vaidya LLP

(57) ABSTRACT

The disclosed subject matter includes providing a surface light source device with a high brightness and a uniform brightness and a LCD unit having the same qualities. The surface light device can include a plurality of line light sources mounted on a circuit board and a light guide located above the plurality of line light sources. The light guide can include a bottom surface for receiving light emitted from the plurality of line light sources and a top surface configured to reflect the light totally on an inner surface thereof. The light can be emitted upwards from the top surface after repeating many total reflections in the light guide. Therefore, the light that is emitted can have a uniform brightness. The surface light source device can define the brightness and the shape for the LCD unit according to variations of the plurality of line light sources and the light guide.

20 Claims, 12 Drawing Sheets

SURFACE LIGHT SOURCE DEVICE AND LCD UNIT

This application claims the priority benefit under 35 U.S.C. §119 of Japanese Patent Application No. 2007-067585 filed on Mar. 15, 2007, which is hereby incorporated in its entirety by reference.

BACKGROUND

1. Field

The presently disclosed subject matter relates to a surface light source device and a LCD unit including the same, and more particularly to a surface light source device which can be configured to exhibit high brightness and uniform brightness and can utilize a plurality of line light sources. Thus, the surface light source device can be employed as a light source for a back light unit located adjacent a liquid crystal display (LCD) of a television and the like. Therefore, a LCD unit including the same can exhibit high brightness and uniform brightness even on a large screen.

2. Description of the Related Art

Conventional optical transmission displays such as LCDs and the like are typically illuminated from a rear portion thereof by a surface light source device in order to light their displays. In a color LCD unit used for a personal computer or a television, the light transmission rate thereof decreases due to various reasons including a restriction of an aperture ratio, a color filter, etc. Thus, the LCD unit is illuminated from its back using a back light unit like the surface light source device.

The surface light source device for a back light unit that illuminates from the back of the display unit can be broadly classified into an edge light type and a direct light type (when classified by location of the light source). The edge light type is composed of a light guide and at least one light source, which is located at least one edge of the light guide so as to emit light from one surface of the light guide. Thus, in an edge light type, the light-emitting direction of the surface light source device is substantially perpendicular to that of the at least one light source.

On the other hand, the surface light source device of the direct light type is composed of a diffusing member and a plurality of light sources, which are located rearward of the diffusing member so as to emit a diffusing light from the plurality of light sources via the diffusing member. Thus, according to the direct light type device, the light-emitting direction of the surface light source device is basically or substantially in the same direction as the light emitting direction of the plurality of light sources.

Consequently, because the number of light sources in an edge light type device is limited due to their location about a perimeter of the light guide, the surface light source device of the edge light type is sometimes not suitable for use as a back light unit when the device is of a large size and/or requires high brightness. However, because the direct light type device can include many light sources, and light emitted from the light sources can be directly emitted in a direction parallel with or towards the light-emission direction of the general surface light source device, the direct light type device is often employed for the back light unit when requiring a large size and high brightness, for instance, in a LCD television monitor of a large size, a LCD monitor of a computer, etc.

In the surface light source device of the above-described direct light type, a plurality of point light sources such as LEDs and the like are often used to constitute the light-emitting device. For example, in a method for making a surface light source device that emits white light, multicolor LEDs can be used in accordance with principles of additive color mixture. Specifically, the surface light source device can emit white light by mixing three different colored lights including a red LED, a green LED and a blue LED via a light-diffusing member. A method for making and using a white LED can also be employed in the surface light device and can include coating a yellow phosphor on a blue LED chip.

However, the direct light type surface light source device includes a problem in that a uniformity of the brightness thereof decreases when making a large size device and/or high brightness device. On the other hand, when trying to make a surface light source device having uniform brightness, the brightness of the surface light source device decreases and/or a thickness thereof becomes thick. Therefore, various structures used in surface light source devices that are large in size and/or emit a uniform brightness have been devised.

For example, a method for improving the uniformity of the brightness of a LCD panel is disclosed in Patent Document No. 1 (Japanese Patent Application Laid Open No. JP2006-058481). According to a back light unit using the surface light source device disclosed in Patent Document No. 1, the back light unit is composed of a light source unit including many LEDs, and a light-diffusing plate. The light source unit including the many LEDs located at a predetermined interval is located rearward of a LCD panel. The light-diffusing plate is located between the LCD panel and the light source unit and provides reflecting patterns on one surface thereof facing towards the LEDs. Each of the reflecting patterns is located opposite the LEDs and is composed of a light-reflective ink based upon an ellipse, which has a minor axis that is longer than a diameter of each of the LEDs.

According to the back light unit using the surface light source device having the above-described structure, light emitted at a large angle from each of the LEDs enters the light-diffusing plate at an area other than the reflecting patterns located on the light-diffusing plate, and is emitted from the opposite surface of the light-diffusing plate while being diffused as it passes through the light-diffusing plate.

At the same time, light emitted at a narrow angle from each of the LEDs is reflected from/on the reflecting patterns of the light-diffusing plate and reflects again on a surface of the light source unit. Then, a part of the reflected light enters the light-diffusing plate from an area other than the reflecting pattern area of the light-diffusing plate and is emitted from the other opposite surface while being diffused during transmission in the light-diffusing plate.

Therefore, because bright light emitted at a narrow angle from each of the LEDs reflects on the surface of the light source unit and does not pass through the reflecting patterns of the light-diffusing plate, the various beams or rays of light emitted from each of the LEDs are mixed with each other and become an approximately uniform brightness as a whole. Thus, the back light unit using the above-described structure can prevent irregular brightness and irregular color because the light emitted from the other/opposite surface of the light-diffusing plate becomes uniformly bright and has a uniform color by being diffused in the light-diffusing plate.

A back light unit using a surface light source device emitting a uniform white light is disclosed in Patent Document No. 2 (Japanese Patent Application Laid Open No. JP2005-339822). According to Patent Document No. 2, the back light unit includes: a reflector including a light-reflecting surface thereon; a plurality of light guides located on the light-reflecting surface of the reflector, and each of the plurality of light guides being composed of a transparent cylindrical body; and side-emission type LEDs including a red LED, a green LED and a blue LED located in each of the plurality of light guides, and each of the side-emission type three color LEDs including a total reflecting surface on a top surface lens thereof.

According to the above-described back light unit, because light emitted towards the top surface from each of the side-emission type three color LEDs reflects on the total reflecting surface located on the top surface of each lens of the LEDs, all light emitted from each of the side-emission type three color LEDs is substantially diffused in side directions. Therefore, because light emitted towards each top surface of the side-emission type three color LEDs decreases and light emitted in side directions increases, their light-pass length becomes long.

Consequently, the light rays emitted from each of the side-emission type three color LEDs are completely mixed with each other to achieve an approximately uniform brightness. Thus, the back light unit using the above-described structure can prevent irregular brightness and/or irregular color from occurring in a direction towards the light-emission thereof by maintaining a uniform brightness and a uniform color on an emitting surface of the above-described plurality of light guides.

On the other hand, Patent Document No. 3 (Japanese Patent Application No.

JP2006-304308) discloses a surface light source device that can effectively prevent irregular brightness and/or irregular color. FIG. 10 is a schematic cross-section view of the conventional surface light source device according to Patent Document No. 3 and FIG. 11 is a partial enlarged cross-section view depicting a relevant part of the conventional surface light source device shown in FIG. 10.

In FIGS. 10 and 11, the surface light source device 1 is composed of a circuit board 2, a plurality of LEDs 3, a light guide 4, a diffusing plate 5, a prismatic sheet 6, a diffusing reflection film 7 and a casing 8. The plurality of LEDs 3 include a first set of LEDs that are located at a predetermined interval in one direction on the circuit board 2 and formed flat, and another set of LEDs that are located at another predetermined interval in another direction perpendicular to the one direction. That is to say, the plurality of LEDs 3 is located on the circuit board 2 in a matrix state. In this case, for example, the plurality of LEDs 3 includes three different color LEDs including a red LED 3R, a green LED 3G and a blue LED 3B, and are dispersedly disposed so that the same color LEDs are not located adjacent to each other, as shown in FIG. 10.

The light guide 4 is located above the plurality of LEDs 3, and the diffusing plate 5 is located above the light guide 4. In addition, the prismatic sheet 6 is located above the diffusing plate 5. The diffusing reflection film 7 is located on the same surface of the circuit board 2 as are the plurality of LEDs 3 (with the exception of the mounting portion of the plurality of LEDs 3). The casing 8 holds the circuit board 2 and the light guide 4 so as to be able to illuminate a light emitted from the plurality of LEDs 3 via the light guide 4, the diffusing plate 5 and the prismatic sheet 6.

The light guide 4 is configured with a transparent material and a top surface thereof includes a plurality of curved surfaces 4a formed with a continuous arch in the one direction of the plurality of LEDs 3, as shown in FIG. 11. Each of base lines 4b located at the lowest portions on the plurality of curved surfaces 4a corresponds with each optical axis of the plurality of LEDs 3. In other words, the optical axis of the LEDs intersect with the base lines. Thus, a pitch of the plurality of curved surfaces 4a is the same interval as that of the plurality of LEDs 3 in the one direction and the plurality of curved surfaces 4a is formed convexly upwards between the respective adjacent two LEDs of the plurality of LEDs 3. The plurality of curved surfaces 4a are configured to reflect light entering into the light guide 4 on an inner surface thereof.

The light guide 4 includes a plurality of concave channels 4c formed concavely upwards and into a bottom surface thereof. The term concave is used to describe the inner surface of the channels 4c as viewed in the light emitting direction away from the device. The cavities or open portions of the channels 4c are actually concave when viewed in a direction from behind the device and in the light emitting direction. Each of the plurality of concave channels 4c is located in each line corresponding to each other direction of the plurality of LEDs 3. Each width of the plurality of concave channels 4c is wider than a width of each of the plurality of LEDs 3 so as to be able to dispose each of the plurality of LEDs 3 in each of the plurality of concave channels 4c. In addition, the light guide 4 includes a plurality of concave voids 4d between the respective adjacent two concave channels of the plurality of concave channels 4c on the bottom surface thereof.

The above-described top surface and bottom surface of the light guide 4 extend in accordance with the other direction of the plurality of LEDs 3. FIG. 12 is a schematic perspective assembly view depicting an attachment method for attaching the light guide 4 to the circuit board 2 in the conventional surface light source device 1 shown in FIG. 10. The casing 8 is configured with a box shape, which can include the circuit board 2 on a bottom surface thereof and can include an opening on a top surface thereof. The light guide 4 is attached to the casing 8 via the opening of the casing 8.

According to the surface light source device 1 of the above-described structure, a light emitted from each of the plurality of LEDs 3 enters into the light guide 4 from each of the plurality of concave channels 4c in which each of the plurality of LEDs 3 is disposed, and the light then reaches the respective inner surfaces of the plurality of curved surfaces 4a. In this case, because the plurality of curved surfaces 4a are configured to reflect totally the light on the respective inner surfaces thereof regardless of incidence angle, the light emitted from each of the plurality of LEDs 3 travels in an approximately sideways directions due to the total reflection on the respective inner surfaces as shown by arrow lines in FIG. 10.

One of the light rays reflected on one of the respective inner surfaces enters into the plurality of concave voids 4d on the bottom surface of the light guide 4 and reflexes/diffuses thereon. The other passes through the plurality of concave voids 4d and reflexes/diffuses on the diffusing film 7, and enters into the light guide 4 from the bottom surface of the light guide 4 again. Therefore, their lights entered into the light guide 4 are emitted outside from the top surface of the light guide 4 in a diffusing state and is also further diffused in the diffusing plate 5. Thus, the light emitted from each of the plurality of LEDs 3 is emitted from the surface light source device 1 in accordance with a predetermined controlling direction of the prismatic sheet 6.

According to the above-described structure, because the light emitted from each of the plurality of LEDs 3 is mixed with each other, the surface light source device 1 can emit an illuminating light having a relatively uniform brightness distribution on the whole. In this case, because light of different color is emitted from each of the plurality of LEDs 3 and then respectively mixed, the surface light source device 1 can emit illuminating light having a relatively uniform color distribution on the whole.

The above-referenced Patent Documents are listed below and are incorporated herein by reference.

1. Patent Document No. 1: Japanese Patent Application Laid Open JP2006-058481
2. Patent Document No. 2: Japanese Patent Application Laid Open JP2005-339822
3. Patent Document No. 3: Japanese Patent Application JP2006-304308

However, in the back light unit and surface light source structure disclosed in Patent Document No. 1, the reflecting patterns of the light-diffusing plate may be adjusted to have a diffusing rate corresponding to each optical axis of the LEDs at corresponding portions. In addition, because directivity characteristics and brightness of the LEDs is respectively different with respect to each other and with respect to each of LED products, the reflecting patterns may be required to be adjusted in terms of a density and distribution thereof with respect to each of the LEDs and each of the LED products in order to optimize a diffusing rate.

Thus, because the above-described adjustment is tough work, the back light unit may result in increased cost for the product. In addition, because the above described back light unit includes a process for manufacturing reflecting patterns, which is not required in a surface light source device of the conventional direct light type, and also includes a process for manufacturing the respective different reflecting patterns in each of the LED products, manufacturing costs for the back light unit may increase.

In the back light unit that includes the surface light source structure of Patent Document No. 2, because the light emitted from each of the LEDs is only transmitted in side directions using a directivity characteristic of the side-emission type LED, the reflector may be required to optimize a diffusing rate distribution on its light-reflecting surface. In addition, even when using the side-emission type LEDs, a part of the light emitted from each of the side-emission type LEDs that is not reflected on the top surface of the lens may leak out along a right overhead central axis near the top surface of the lens of the LED.

Thus, the back light unit may easily cause an irregular color, an irregular brightness, etc. Moreover, because each of the side-emission type LEDs may require a complex structure and a complex lens shape, the cost of the back light unit that uses many side-emission type LEDs may increase along with many man-hours.

In the surface light source device 1 shown in Patent Document No. 3, a point light source such as a plurality of LEDs 3 is used as the light source. The plurality of LEDs 3 is located in a matrix state. An irregular brightness may improve based upon the plurality of curved surfaces 4a formed on the light guide 4 in the one/first direction of the plurality of LEDs 3. However, because the plurality of LEDs 3 are disposed at an equal interval in the other direction perpendicular to the one/first direction, a brightness of positions between two respective adjacent LEDs with respect to each other may decrease. Thus, the uniformity of brightness of the surface light source device 1 may decrease.

In addition, because an area near the intersection of two diagonal lines of the plurality of LEDs 3 (as shown in FIG. 12) is far from each of the plurality of LEDs 3, a brightness of the intersection area may decrease. Thus, the surface light source device 1 may emit an irregular and/or decreased brightness. This is especially possible when high power LEDs are used for the plurality of LEDs in order to make the surface light source device 1 with a high brightness, and thus irregular brightness may be easily caused.

The disclosed subject matter has been devised to consider the above and other problems and characteristics. Thus, embodiments of the disclosed subject matter can include a surface light source device that does not cause (or depreciates) some or all of the above-described and other problems and that can emit a light from an arbitrary large area with high brightness and uniform brightness. In addition, the surface light source device can become thin even when increasing the brightness thereof and when the emitting area thereof becomes large. The disclosed subject matter can also include a LCD unit using the surface light source device as described. The LCD can be configured to increase the brightness of the display and provide uniform brightness, and to display at an arbitrary size and at a wide range, etc.

SUMMARY

The presently disclosed subject matter has been devised in view of the above and other problems and characteristics in the conventional art, and to make certain changes to the existing structures of conventional surface light sources. An aspect of the disclosed subject matter includes providing a surface light source device that can emit a light from an arbitrary large area with high brightness and uniform brightness using a plurality of line light sources. Furthermore, the surface light source device can maintain a thin profile even when increasing the brightness thereof and when the emitting area thereof becomes large. Thus, the surface light source device of the disclosed subject matter can be employed as a light source for a back light unit located at the rear of a LCD panel of a television, computer monitor, and the like.

Another aspect of the disclosed subject matter includes providing a LCD unit using the above-described surface light source device that can display with high brightness and high uniformity even on a large screen. In addition, because the LCD unit can be formed with a substantially thin profile, it can be employed as a display unit for a television, a personal computer, etc.

According to an aspect of the disclosed subject matter, a surface light source device can include: a circuit board including conductive patterns thereon; a plurality of line light sources located substantially parallel with respect to each other on the circuit board through the conductive patterns; and a light guide including a top surface and a bottom surface thereon located upwards the plurality of line light sources, the top surface including a plurality of two-dimensional curved surfaces that is configured to have each base line of the lowest portions on the plurality of two-dimensional curved surfaces corresponded to substantially each optical axis of the plurality of line light sources and is configured to have each surface of the plurality of two-dimensional curved surfaces formed curved upwards between the respective adjacent two line light sources of the plurality of line light sources, the bottom surface configured to receive a light emitted from each of the plurality of line light sources therein, wherein the plurality of two-dimensional curved surfaces is configured to reflect totally the light emitted from each of the plurality of line light sources on each inner surface of the plurality of two-dimensional curved surfaces.

According to the above-described exemplary surface light source device, the light emitted from each of the plurality of line light sources can enter into the light guide from the bottom surface of the light guide and the light can totally reflect on each inner surface of the plurality of two-dimensional curved surfaces of the light guide in side directions. The above-described light can be finally emitted upwards from the top surface of the light guide while repeating the total reflection time and time again in the light guide. Thus, a light-pass length from the light-emission of the light until the light-outgoing to the outside can become very long and the light can be enough mixed with respect to each other, the surface light source device of the disclosed subject matter can emit the light from the light guide with a uniform brightness.

In this case, each of the plurality of line light sources can continuously emit the light in the form of a line and can be voluntarily located substantially parallel with respect to each other on the circuit board. Thus, the surface light source device of the disclosed subject matter can emit the light of the plurality of line light sources from an arbitrary large light guide with a high brightness and the uniform brightness while maintaining the thickness thereof.

In the above-described exemplary surface light source device, the surface light source device can also include the bottom surface of the light guide that can be configured with a plurality of two-dimensional concave channels to dispose the plurality of line light sources and the plurality of two-dimensional concave channels can be configured to have each top line of the plurality of two-dimensional concave channels corresponded to substantially each optical axis of the plurality of line light sources. Each of the plurality of two-dimensional concave channels can be configured to form inverted v-shaped. The bottom surface of the light guide can also include a plurality of two-dimensional concave voids between the respective adjacent two line light sources of the plurality of line light sources.

According to the above-described exemplary surface light source device, a light emitted right above from each of the plurality of line light sources can diffuse/enter into the light guide from each of the plurality of two-dimensional concave channels of the bottom surface and can totally reflect on each of the plurality of two-dimensional curved surfaces without passing through the light guide. Thus, because the light emitted right above from each of the plurality of line light sources cannot directly pass through each base line of the top surface of the light guide, the surface light source device can prevent from occurring an irregular brightness. In this case, when each of the plurality of two-dimensional concave channels can be configured to form inverted v-shaped, the irregular brightness can be further prevented because of a decrease of the light passing right overhead and the like.

In addition, when the bottom surface of the light guide includes a plurality of two-dimensional concave voids between two respective adjacent line light sources of the plurality of line light sources, an incident light on the bottom surface of the light guide can reflect diffusely. Thus, because the light emitted from the top surface of the light guide to the outside can favorably diffuse, the surface light source device of the disclosed subject matter can emit light from the plurality of line light sources with more high brightness and more uniform brightness.

In the above described exemplary surface light source device, the surface light source device can further include at least one of light diffusing members and light condensing members, wherein at least the one is mounted on the light guide. The surface light source device can also further include at least one reflecting member, where at least the one is mounted on the circuit board.

In the above-described exemplary surface light source device, when the surface light source device can further include at least one of light diffusing members and light condensing members on the light guide, the light emitted from the light guide to the outside can be controlled by the diffusing member and the light condensing member. In this case, because the diffusing member can further diffuse the light, the uniformity of the light emitted to the outside can improve and the directive characteristics of the light can be controlled by the light condensing member.

In addition, when the surface light source device further includes at least one reflecting member on the circuit board, a light passing through the bottom surface of the light guide can diffuse/reflect on at least the one reflecting member and can be entered into the light guide again. Thus, because the usability of the plurality of line light sources can be improved, the surface light source device of the disclosed subject matter can emit the light with more high brightness.

Another aspect of the disclosed subject matter includes a liquid crystal display unit including the immediately above-described surface light source device that can include: a liquid crystal display located on the surface light source device, wherein the plurality of line light sources is a cold cathode fluorescent lamp.

According to the above-described exemplary liquid crystal display unit, the above-described surface light source device can emit the light of the plurality of line light sources from the arbitrary large light guide with the high brightness and the uniform brightness. In addition, because the light guide can be formed the two-dimensional structure, various shapes of the light guide can be easily produced with low cost by the combination of only an extrusion molding and cutting process. Thus, the surface light source device can be employed as a light source for the back light unit for various LCD panels, and therefore the LCD unit can be used as a display unit for a television, computer monitor, display, etc.

In accordance with another aspect of the disclosed subject matter, a light source device configured to direct light in a light emitting direction can include a housing structure including a housing surface that faces in the light emitting direction, a light guide having a bottom surface located adjacent to and facing the housing surface, and having a top surface located further from the housing surface than the bottom surface, the light guide having a thickness defined between the top surface and bottom surface and a length extending orthogonal to the thickness and from at least one side surface to an opposite side surface of the light guide, and a plurality of elongate light sources each extending along at least a substantial portion of the length of the light guide and along a respective longitudinal axis of each of the plurality of light sources, the plurality of elongate light sources located between the housing structure and the light guide, wherein the top surface of the light guide includes a plurality of convex surfaces separated from each other by a plurality of troughs, each of the troughs extending substantially in parallel with the longitudinal axis of a respective elongate light source, and each of the troughs being substantially centered as viewed from the light emitting direction over the longitudinal axis of a respective elongate light source. The substantial portion of the length could be defined as more than a quarter or more than a half of the length.

BRIEF DESCRIPTION OF THE DRAWINGS

These and other characteristics and features of the disclosed subject matter will become clear from the following description with reference to the accompanying drawings, wherein.

DETAILED DESCRIPTION OF EXEMPLARY EMBODIMENTS

Figure 1:
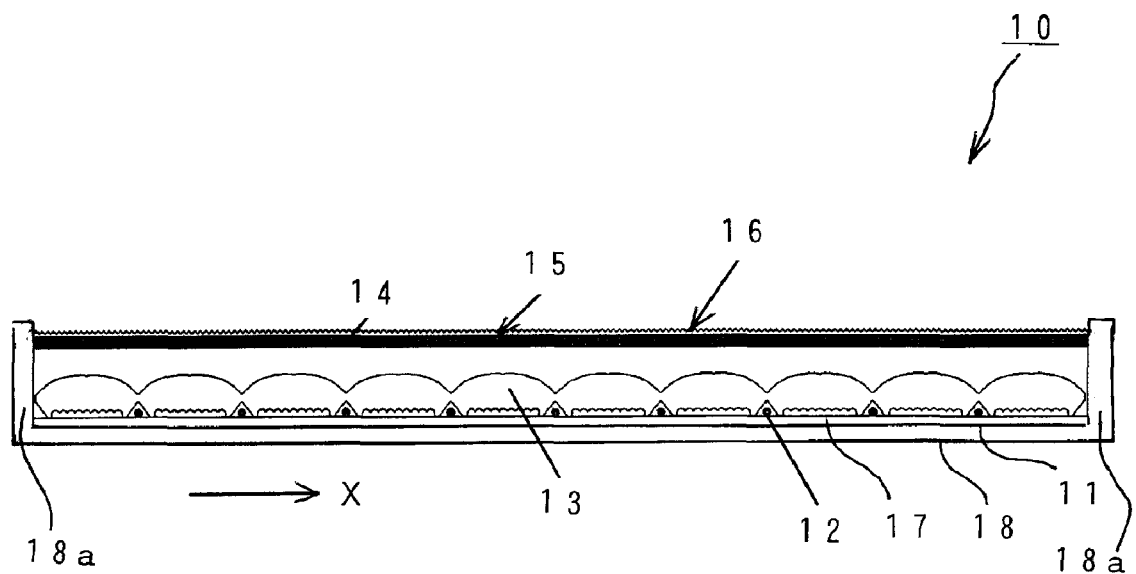
FIG. 1 is a schematic cross-section view showing an exemplary embodiment of a structure for a surface light source device made in accordance with principles of the disclosed subject matter.

Exemplary embodiments of the disclosed subject matter will now be described in detail with reference to FIG. 1 to FIG. 9. FIG. 1 is a schematic cross-section view showing an exemplary embodiment of a structure for a surface light source device made in accordance with principles of the disclosed subject matter. The surface light source device 10 can be composed of a housing structure that can be configured to include or comprise a circuit board 11, a plurality of line light sources 12, a light guide 13, a diffusing plate 14, a diffusing sheet 15, a prismatic sheet 16, a reflecting member such as a diffusing reflection film 17, and a casing 18.

The circuit board 11 can be configured with a flat printed circuit board and can be configured to form conductive patterns for providing the plurality of line sources 12 with a power supply on a surface thereof. The circuit board 11 can also be covered with the diffusing reflection film 17 thereon. The plurality of line sources 12 can be configured as, for example, a cold cathode fluorescent lamp (CCFL), a hot cathode fluorescent lamp (HCFL), etc.

The plurality of line sources 12 can be located substantially parallel with respect to each other and at a predetermined interval in one direction (X direction) on the circuit board 11 while extending in the other direction (Y direction) perpendicular to the X direction. Thus, the plurality of line sources 12 can emit and form a plurality of linear lights parallel with respect to each other at the predetermined interval in the X direction on the circuit board 11 by receiving a power supply via the conductive patterns of the circuit board 11.

Figure 2:
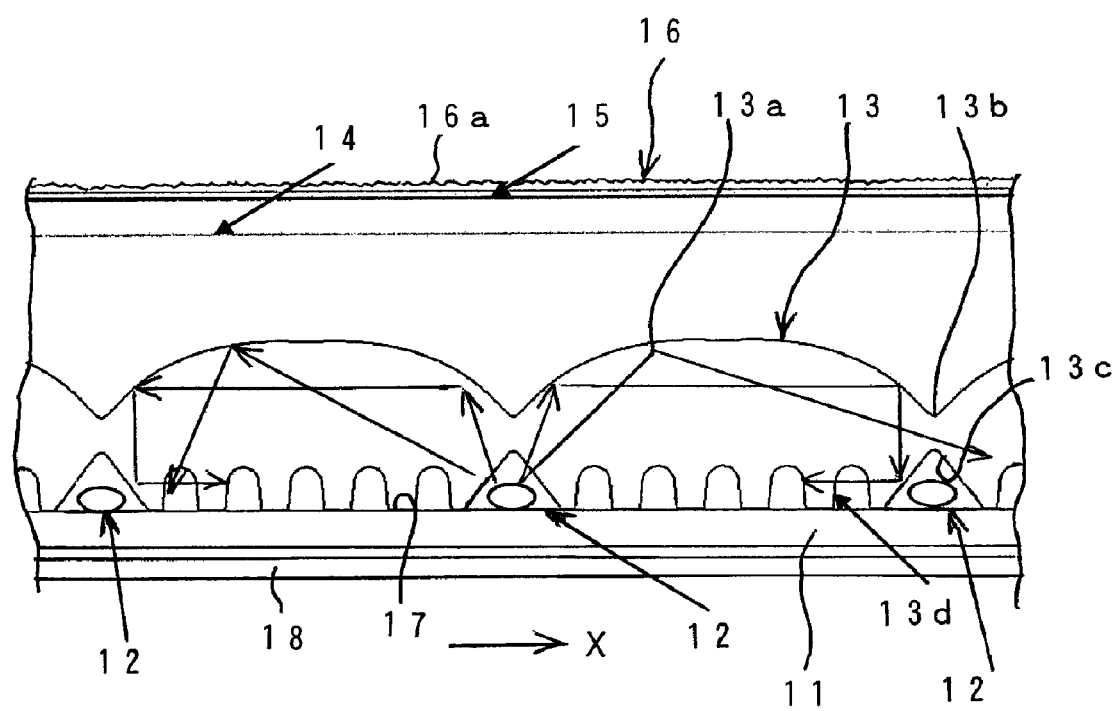
FIG. 2 is a partial enlarged cross-section view showing a relevant part of the surface light source device shown in FIG. 1.

FIG. 2 is a partial enlarged cross-section view showing a relevant part of the surface light source device 10 shown in FIG. 1. The light guide 13 can be configured with a transparent material and a top surface thereof can include a plurality of two-dimensional curved surfaces 13a, which can be continuously formed and arched at the same interval as that of the plurality of line light sources 12 in the X direction as shown in FIG. 2. The above-described top surface formed in the X direction can be configured to extend along the plurality of line light sources 12 in the Y direction perpendicular to the X direction.

In this case, troughs can be formed as base lines 13b that comprise the lowest portions on the plurality of two-dimensional curved surfaces 13a and which can be configured to correspond to each central axis of the plurality of line light sources 12 mounted on the circuit board 11. Thus, the plurality of two-dimensional curved surfaces 13a can be formed in an upward convex manner between two respective adjacent line light sources of the plurality of line light sources 12.

In addition, the plurality of two-dimensional curved surfaces 13a can be configured to allow a total reflection of light that enters into the light guide 13 on an inner surface thereof as described in more detail later. That is to say, after light that is emitted from each of the plurality of line light sources 12 enters into the light guide 13, the light can be directed at a larger angle than the critical angle to each inner surface of the plurality of two-dimensional curved surfaces 13a. Thus, each of the plurality of two-dimensional curved surfaces 13a can expand in a v-shaped manner upwards from each of the base lines 13b.

The light guide 13 can be configured to include a plurality of two-dimensional concave channels 13c on a bottom surface thereof and each of the plurality of two-dimensional concave channels 13c can be configured to correspond in space to each of the plurality of line light sources 12. The term concave is used to describe the inner surface of the channels 13c as viewed in the light emitting direction and away from the device. The cavities or open portions of the channels 13c are actually concave when viewed in a direction from behind the device and in the light emitting direction. Each of the plurality of two-dimensional concave channels 13c can be formed with a wider width than each width of the plurality of line light sources 12 and continuously in the Y direction perpendicular to the X direction so as to be able to dispose each of the plurality of line light sources 12 mounted on the circuit board 11 therein.

Each of the plurality of two-dimensional concave channels 13c can be configured to receive the light emitted from each of the plurality of line light sources 12 into the light guide 13 while diffusing the light. For example, each of the plurality of two-dimensional concave channels 13c can be formed in an inverted v-shape as shown in FIG. 2. A top angle thereof can be configured to diffuse the light that enters into the light guide 13 from both sides thereof upwards and to totally reflect the light on each inner surface of the plurality of two-dimensional curved surfaces 13a.

In addition, the light guide 13 can include a plurality of two-dimensional concave voids 13d between the two adjacent two-dimensional concave channels of the plurality of two-dimensional concave channels 13c on the bottom surface of the light guide 13. Again, in this context, the term concave is used to describe the inner surface of the voids 13d as viewed in the light emitting direction and away from the device. The actual open portions of the voids 13d are actually concave when viewed in a direction from behind the device and in the light emitting direction. The plurality of two-dimensional concave voids 13d can be configured to extend alongside the plurality of line light sources 12 in the Y direction perpendicular to the X direction and each of the plurality of two-dimensional concave voids 13d can be formed to be relatively narrow.

For instance, five two-dimensional concave voids 13d can be included between two adjacent line light sources, as shown in FIG. 2. Therefore, light that reaches each of the plurality of two-dimensional concave voids 13d at the bottom surface in the light guide 13 can diffuse thereon and can be reflected in accordance with each shape of the plurality of two-dimensional concave voids 13d.

According to the two-dimensional structure of the above-described light guide, the light guide 13 including the above-described top surface and bottom surface can be manufactured by a general extrusion molding process. Thus, the light guide 13 including the plurality of two-dimensional curved surfaces 13a and the plurality of two-dimensional concave channels 13c and the plurality of two-dimensional concave voids 13d can be easily produced at relatively low cost. Furthermore, variations of the shape of the light guide 13 as described later do not require a separate or different molding die and can be carried out by using only a cutting process.

The diffusing plate 14 can be configured with or made from a transparent material. The diffusing plate 14 can also be configured to receive the light emitted from the light guide 13 and to emit a diffused light by diffusing the light therein. For example, the diffusing plate 14 can have a concavo-convex shape that is included on at least one surface thereof in order to promote the diffusion of the light emitted from the light guide 13. The diffusing plate 14 can also be formed by mixing particles having a different refractive index from that of the transparent material that makes up the plate 14 so as to encourage the diffusing of the incoming light at boundaries of the particles.

The diffusing sheet 15 can be configured with or made from a transparent material. The diffusing sheet 15 can also be configured to receive the light emitted from the light guide 13 or the diffusing plate 14 and to emit a diffused light by diffusing the light therein. For instance, the diffusing sheet 15 can have at least one patterned indented surface included thereon in order to increase the diffusion. The diffusing sheet 15 can be located on the diffusing plate 14 opposite to the light guide 13 and can also be located on the light guide 13 without the diffusing plate 14.

The prismatic sheet 16 can be configured with or made from a transparent material and can be configured to define a light distribution of the surface light source device 10. For example, the prismatic sheet 16 can be formed with a flat bottom surface thereof and can be formed with a number of micro-prisms 16a extending along the plurality of line light sources 12 in the Y direction on a top surface thereof. The prismatic sheet 16 can be located on the diffusing sheet 15 and opposite to the diffusing plate 14 or light guide 13.

The diffusing reflection film 17 can be configured as an optical resin film and can also be configured to reflect incoming light while also diffusing the incoming light thereon. For example, the diffusing reflection film 17 can have a lot of diffusive micro-cavitations and/or a diffusive material such as a titanium oxide and the like included therein. The diffusing reflection film 17 can be located on the circuit board 11 opposite to the casing 18 which will be described later.

Figure 3:
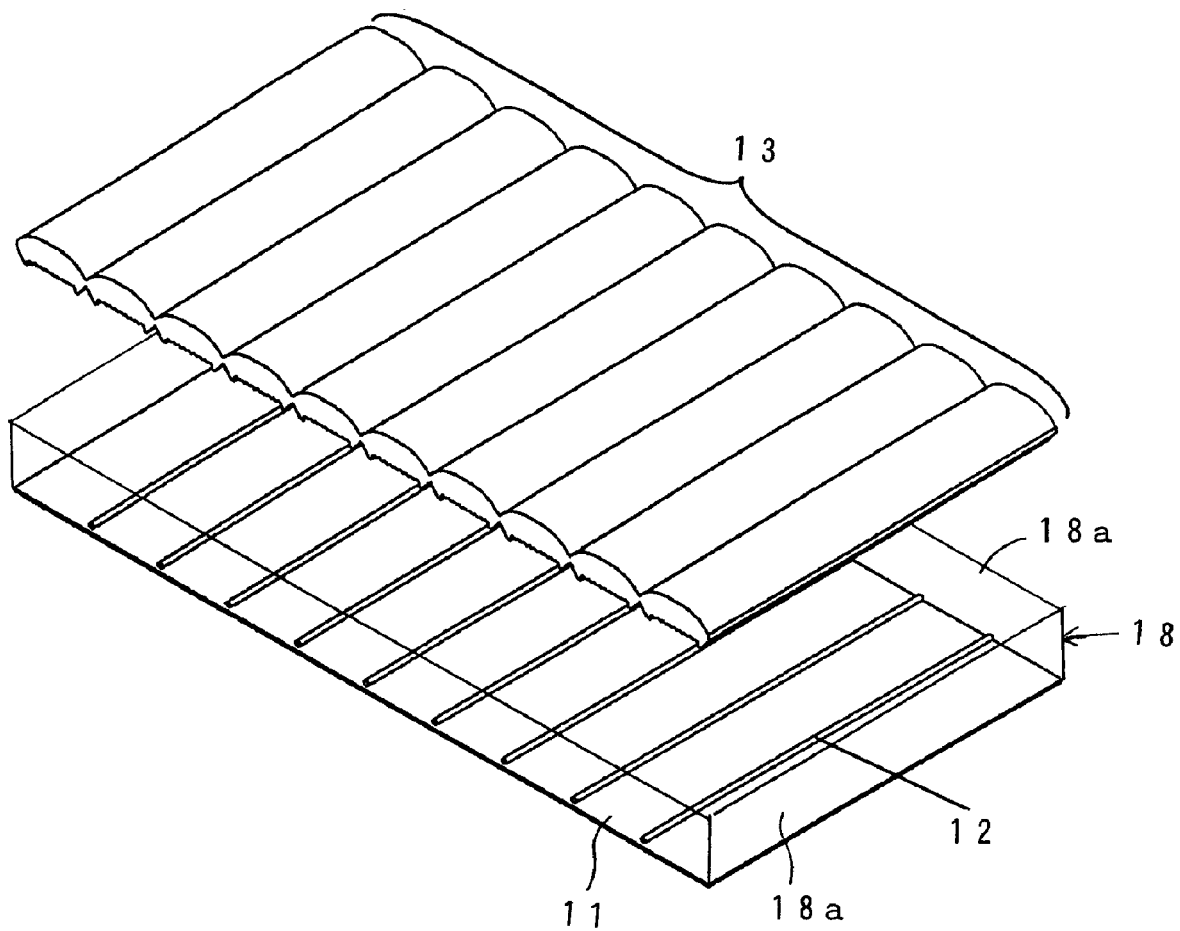
FIG. 3 is a schematic perspective view showing an attachment of a light guide to a circuit board for the surface light source device shown in FIG. 1.

FIG. 3 is a schematic perspective view showing an attachment process for attaching the light guide 13 to the circuit board 11 for the surface light source device 10 shown in FIG. 1. The casing 18 can be configured with a box shape having an opening on a top surface thereof and can be configured to hold the circuit board 11 on a bottom surface thereof. In addition, the casing 18 can be configured to hold the light guide 13 over the circuit board 11 therein. In this case, the casing 18 can be also configured to locate the circuit board 11 and the light guide 13 as shown in FIG. 1. For instance, the casing 18 can position the circuit board 11 and the light guide 13 such that they can be inserted via a peripheral wall 18a having four-cornered stoppers and the like therein.

According to an exemplary embodiment of the disclosed subject matter, the surface light source device 10 can be configured with the above-described structure. When assembling the surface light source device 10, the circuit board 11 including the diffusing reflection film 17 and the plurality of line light sources 12 can be installed into the casing 18, and the light guide 13 including the diffusing plate 14, the diffusing sheet 15 and the prismatic sheet 16 can then be installed into the casing 18. In this case, depending on usage and the like of the surface light source device 10, each of the diffusing plate 14, the diffusing sheet 15 and the prismatic sheet 16 can also be sequentially installed into the casing 18 after installing the light guide 13 into the casing 18.

Therefore, because both the circuit board 11 and the light guide 13 can be positioned in accordance with the parameters of the peripheral wall 18a of the casing 18, the light guide 13 can be located on the circuit board so that each of the base lines 13b thereof can correspond to each optical axis of the plurality of line light sources 12 mounted on the circuit board 11. Thus, the surface light source device 10 can be easily assembled while positioning the respective components with confidence.

In the surface light source device 10 assembled as described above, when the plurality of line light sources 12 are supplied with power, the plurality of line light sources 12 can emit a plurality of linear lights. The light emitted from each of the plurality of line light sources 12 can enter into the light guide 13 from each of the plurality of concave channels 13c of the light guide 13 and can reach each inner surface of the plurality of two-dimensional curved surfaces 13a.

In this case, the plurality of two-dimensional curved surfaces 13a can be configured to totally reflect the light on each inner surface regardless of incoming angle of the light. Therefore, after the light emitted from each of the plurality of line light sources 12 totally reflects on each inner surface of the plurality of two-dimensional curved surfaces 13a, the light can travel in substantially sidewards directions as shown by the arrows in FIG. 2.

A portion of light that is totally reflected on each inner surface of the plurality of curved surfaces 13a can enter into the plurality of two-dimensional concave voids 13d on the bottom surface of the light guide 13 and can be reflected/diffused thereon. Other portions of light can pass through the plurality of two-dimensional concave voids 13d and can reflect/diffuse on the diffusing reflection film 17 located underneath the plurality of two-dimensional concave voids 13d, and can enter into the light guide 13 from the bottom surface thereof again.

As described above, the light that enters into the light guide 13 can be emitted from the top surface of the light guide 13 in a diffused state in side directions with respect to the plurality of line light sources 12 and can be diffused in the diffusing plate 14. The light can also be diffused in the diffusing sheet 15. The above-described diffused light can be emitted in a direction of the light emission direction of the surface light source device 10 in accordance with the light distribution of the prismatic sheet 16. For instance, the prismatic sheet 16 can control the direction characteristics by adjusting the number, the shape and the like of each of the micro-prisms 16a thereon.

Thus, because the light emitted from each of the plurality of line light sources 12 can reflect on the plurality of two-dimensional curved surfaces 13a in both side directions (the X direction on the whole), the respective light of the plurality of line light sources 12 can be respectively mixed in a diffusing state in full. In this case, because each of the plurality of line light sources 12 can be emitted continuously in the Y direction (perpendicular to the X direction and in the upward direction of FIGS. 1 and 2), the typical decrease of the brightness at the intersection area of two imaginary diagonal lines of the plurality of LEDs in the conventional surface light source device 1 shown in FIG. 12 can be improved upon, and therefore the problem of irregular brightness can be avoided and lighting quality can be improved with respect to the X direction.

Figure 4:
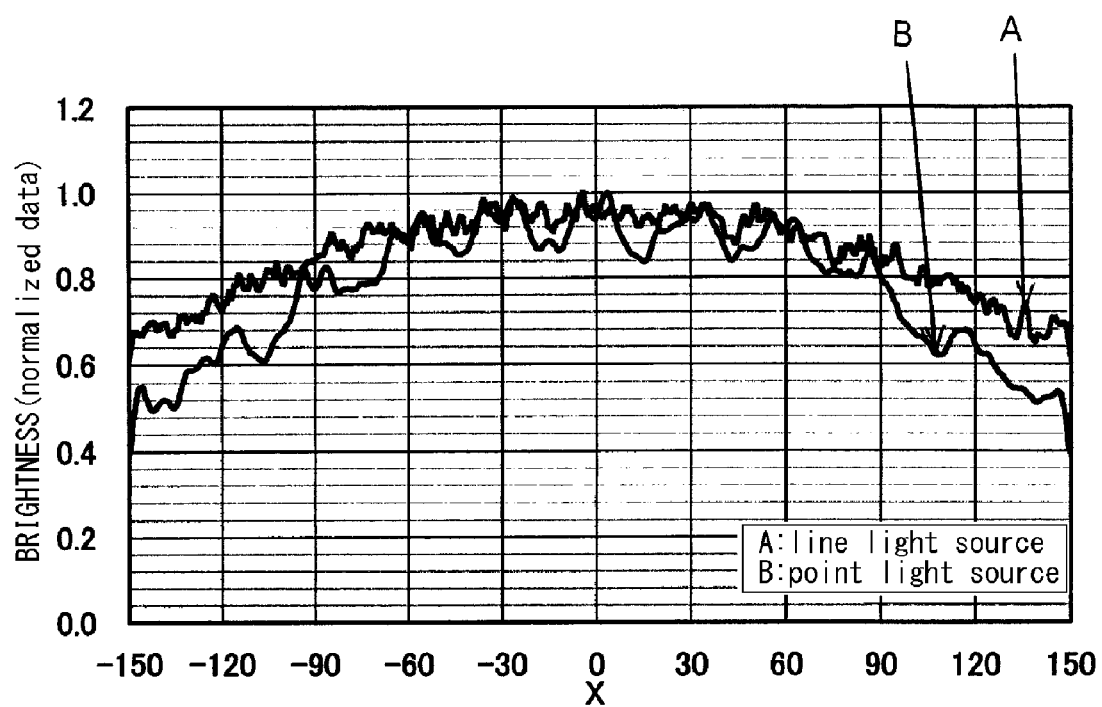
FIG. 4 is a graph showing a brightness distribution for an emission light in the X direction for the surface light source device shown in FIG. 1.
Figure 10:
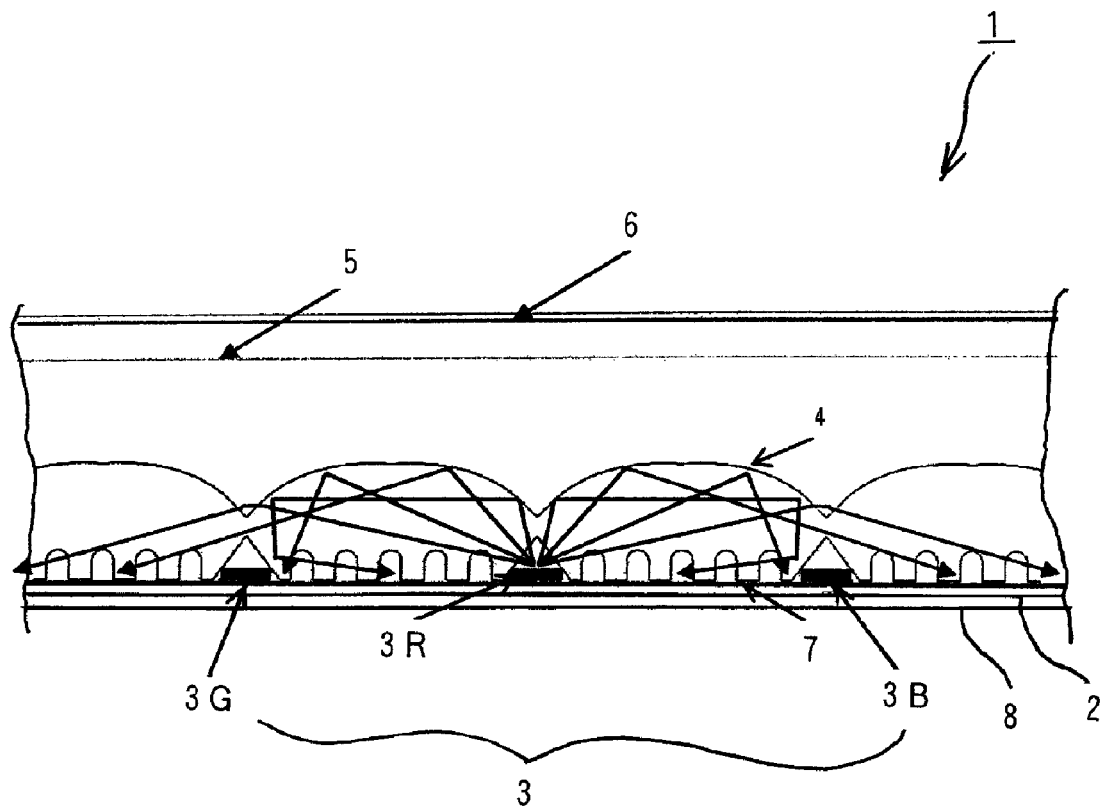
FIG. 10 is a schematic cross-section view depicting an exemplary structure of a conventional surface light source device.
Figure 11:
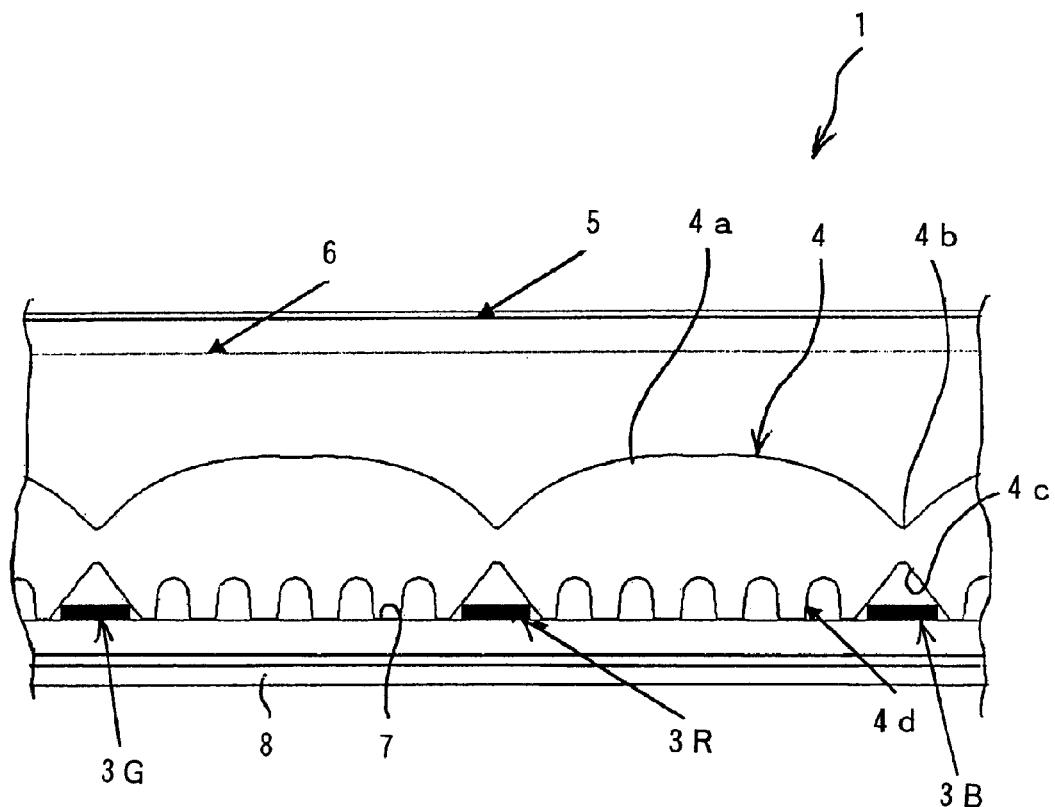
FIG. 11 is a partial enlarged cross-section view depicting a relevant part of the conventional surface light source device shown in FIG. 10.
Figure 12:
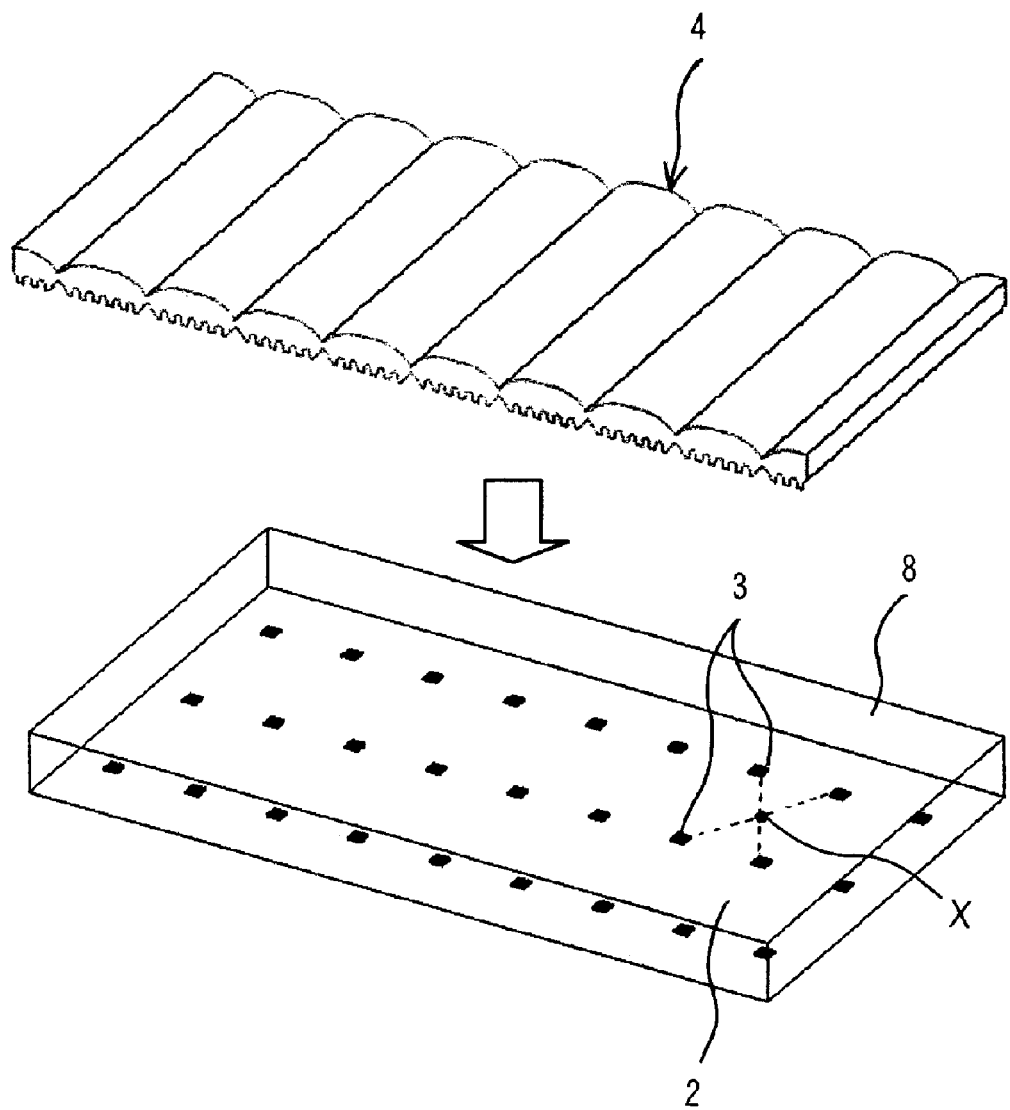
FIG. 12 is a schematic perspective view depicting an attachment of a light guide to a circuit board for the conventional surface light source device shown in FIG. 10.

FIG. 4 is a graph showing a brightness distribution of a light emitting in the X direction of the surface light source device 10 shown in FIG. 1. Line "A" shows a brightness distribution (normalized data) when CCFLs are used as the plurality of line light sources 12 and line "B" shows a brightness distribution (normalized data) according to the conventional surface light source device 1 using the plurality of LEDs as a point light source as shown in FIG. 10 to FIG. 12.

The surface light source device 10 of the disclosed subject matter can emit light having a light distribution with small irregular brightness in the X direction as shown by line "A" in FIG. 4. When comparing the light distribution of the conventional surface light source device 1 shown by line "B," the surface light source device 10 of the disclosed subject matter can be improved with respect to the irregular brightness in the X direction.

Figure 5:
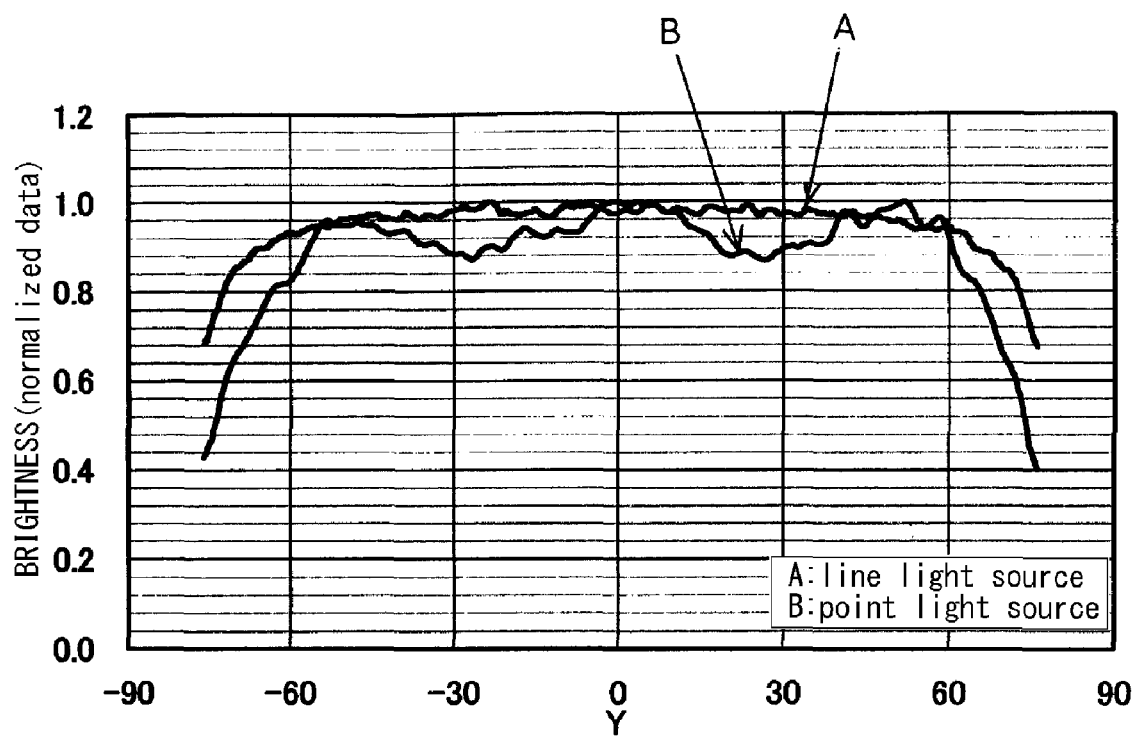
FIG. 5 is a graph showing a brightness distribution for an emission light in the Y direction for the surface light source device shown in FIG. 1.

FIG. 5 is a graph showing a brightness distribution of a light emitting in the Y direction of the surface light source device 10 shown in FIG. 1, wherein lines "A" and "B" each show a brightness distribution (normalized data) based on the same condition as that of FIG. 4. The surface light source device 10 of the disclosed subject matter can exhibit a more regular brightness in the Y direction when compared to that of the conventional surface light source device 1.

The reason why the uniform brightness can be accomplished is that the plurality of line light sources 12 can emit the plurality of linear lights continuously in the Y direction. The continuously emitted light can be emitted upwards with uniform brightness in the Y direction via the prismatic sheet 16. Thus, the surface light source device 10 can emit light having a uniform brightness distribution on the whole in the Y direction as shown by line "A" in FIG. 5.

In this case, when light is emitted in a direct upwards (Y) direction from each of the plurality of line light sources 12, the light enters into the guide 13 near the lowest portions on the plurality of two-dimensional curved surfaces 13a. Because this light can be configured to totally reflect in both side directions (in the X directions), the light cannot be directly illuminated to the outside through the light guide 13. It should be noted that "totally reflected" is a term of art and does not necessarily require 100% reflection.

In addition, very little of the light that enters the light guide 13 right above the light sources 12 and directed at and into each of the base lines 13b as described above may pass through the light guide 13 upwards without total reflection. On the other hand, the other light that may pass through the light guide 13 upwards without total reflection is also a small portion of the emitted light that is directed upwards by total reflection on the diffusing reflection film 17. The remaining light enters into each of the plurality of two-dimensional concave channels 13c and is totally reflected on the plurality of two-dimensional curved surfaces 13a. Because the above-described direct light rays or paths that pass through the light guide 13 can be mixed with each other and can be a very small amount of light, the light does not generate an irregular brightness on the light distribution. Thus, the surface light source device 10 can maintain a uniform brightness distribution.

Figure 6:
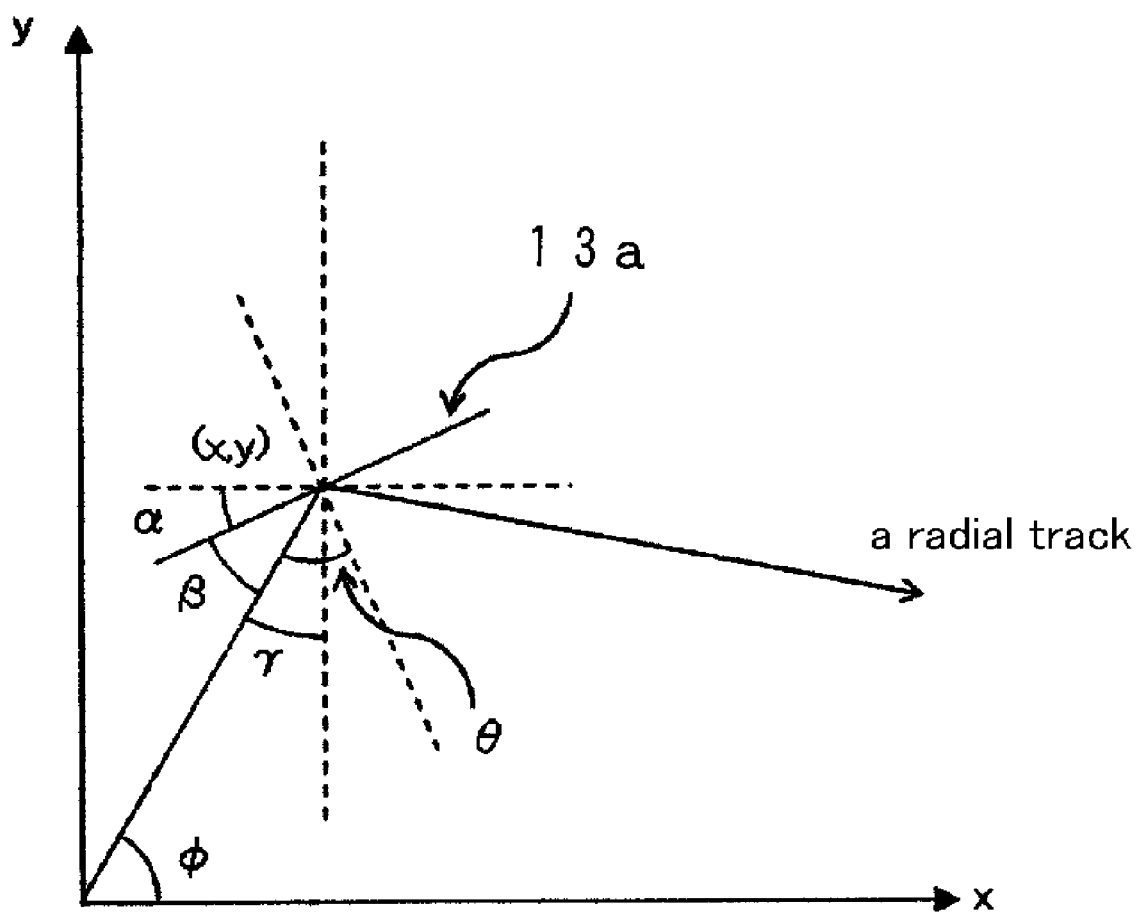
FIG. 6 is a graph showing total reflection characteristics for light emitted from a line light source in a point on a curved surface of a light guide in the surface light source device shown in FIG. 1.

A specific shape of the plurality of two-dimensional curved surfaces 13a of the light guide 13 will now be described. FIG. 6 is a graph showing total reflection of light emitted from a line light source at a point on a two-dimensional curved surface of the light guide in the surface light source device 10 shown in FIG. 1. FIG. 6 assumes that an emitting point of a line light source is located at an origin of an x-y coordinate in the light guide 13. The emitting point is not considered as both a reflection and an inflection at an incoming point to the light guide 13.

Under the above-described condition, when light is emitted at an outgoing angle 4 from the emitting point (0, 0) and enters the light guide 13 at an incoming angle θ at a two-dimensional curved surface 13a of the light guide 13 and reflects, a light incoming point (x, y) on an inner surface of the two-dimensional curved surface 13a can be obtained by the following formulas, wherein α is an angle between the inner surface of the two-dimensional curved surface 13a and the x-axis, β is an angle between the inner surface of the two-dimensional curved surface 13a and the incoming ray, γ is an angle between the incoming ray and the y-axis, n is the index of refraction of the light guide 13, and the incoming angle θ exceeds the critical angle.

$$\phi = \tan^{-1}\left(\frac{y}{x}\right) \quad \text{(formula 1)}$$

$$\beta = \pi/2 - \theta \quad \text{(formula 2)}$$

$$\gamma = \pi/2 - \phi \quad \text{(formula 3)}$$

α can be obtained by formulas 1 to 3. That is, $\alpha = \pi/2 - \beta - \gamma = (\theta - \pi/2) + \tan^{-1}\left(\frac{y}{x}\right)$ Therefore, a differential coefficient of the two-dimensional curved surface 13a at point (x, y) can be as follows.

$$\frac{dx}{dy} = \tan\alpha = \tan\left\{\left(\theta - \frac{\pi}{2}\right) + \tan^{-1}\left(\frac{y}{x}\right)\right\} \quad \text{(formula 4)}$$

Figure 7:
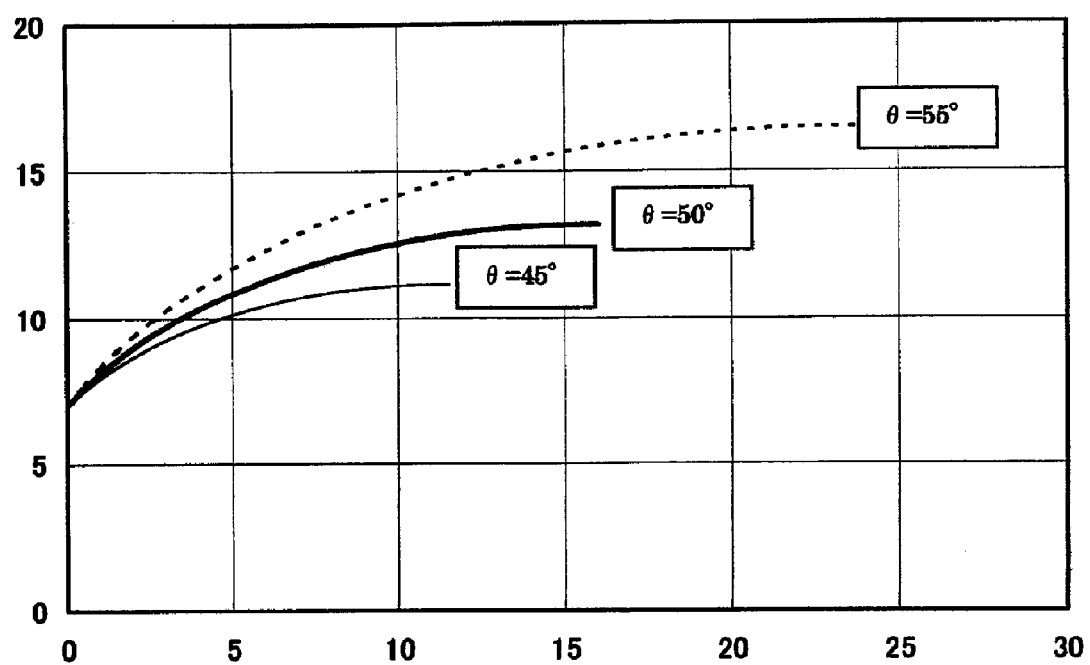
FIG. 7 is a graph showing a design example of a curved shape when an incoming angle θ is defined as a parameter in the surface light source device shown in FIG. 1.

When a differential equation of formula 4 is resolved by substituting a light incoming point (0, 7) as an initial condition, it can give a curved shape for the plurality of two-dimensional curved surfaces 13a, at which light can enter for totally reflecting at an incoming angle θ thereon. FIG. 7 is a graph showing a design example of a curved shape when an incoming angle θ is defined as a parameter in the surface light source device 10 shown in FIG. 1. The "x" and "y" coordinates can be measured in units of millimeters, and the x-y coordinate has an origin at an emitting point of a line light source. The smaller the incoming angle θ becomes, the lower a height of the curved surface becomes as shown in FIG. 7. However, the incoming angle θ must be larger than a critical angle $\theta_0$ given by the following formula 5:

$$\theta > \theta_0 = \sin^{-1}(1/n) \quad \text{(formula 5)}$$

For example, when the light guide 13 is composed of an acrylic resin having a refractive index of 1.49, the critical angle $\theta_0$ is 42.16 degrees. Thus, the incoming angle θ can be 45 degrees by considering a machining accuracy of the plurality of curved surfaces 13a, a positioning accuracy between the light guide 13 and the plurality of line light sources 12, etc.

However, because each of the plurality of line light sources 12 includes a dimension, the light emitted from each of the plurality of line light sources 12 cannot always totally reflect and there is a possibility that an outlying light of each of the plurality of line light sources 12 passes through the light guide 13 and may be emitted directly to the outside. Therefore, when each surface of the plurality of line light sources 12 is designed, each surface position is considered and has an effect on light emission of the light source device 10.

Figure 8:
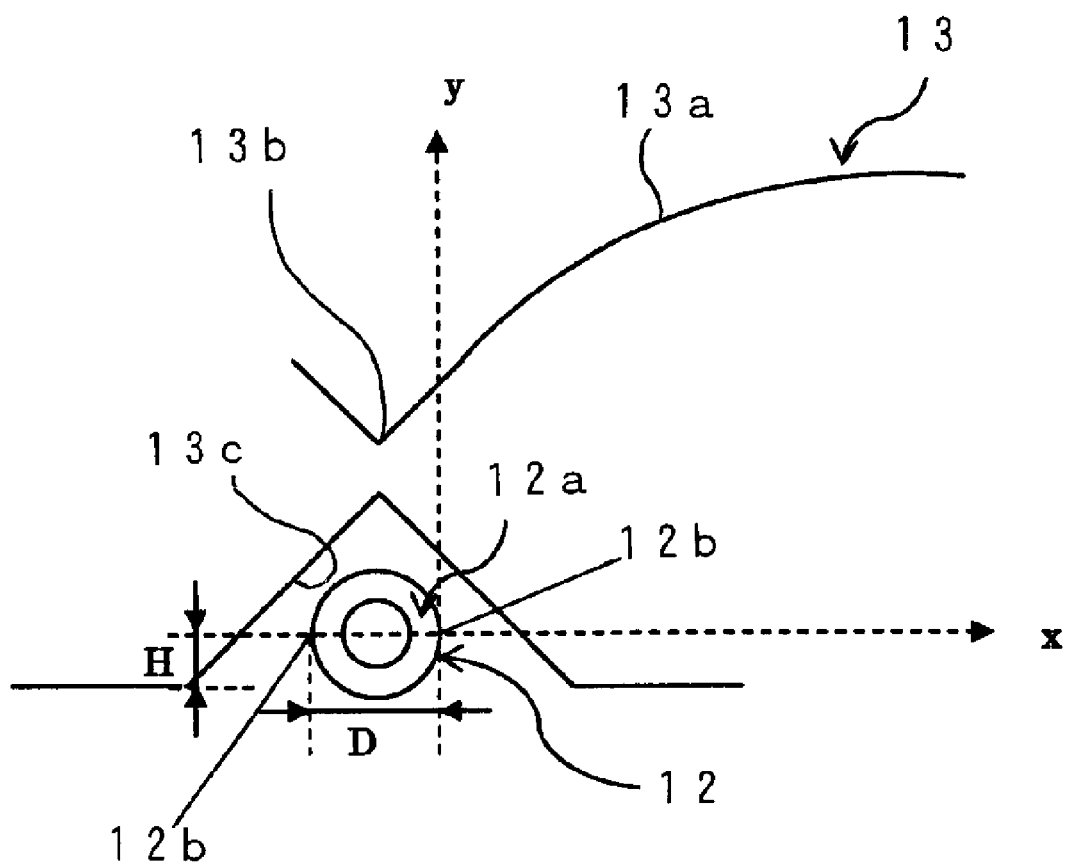
FIG. 8 is a schematic cross-section view depicting a baseline for the curved surface of the light guide in the surface light source device shown in FIG. 1.

FIG. 8 is a schematic cross-section view depicting a baseline for the curved surface of the light guide 13 in the surface light source device 10 shown in FIG. 1. A radial track of the above-described light incoming point (x, y) can be resolved in accordance with reference point 12b (a distance H from the center), which is true for each external wall of the plurality of line light sources 12 by defining each diameter D of the plurality of line light sources 12 as shown in FIG. 8.

According to the above-described reference point, the light emitted from each of the plurality of line light sources 12 can be directed at the above-described incoming angle or larger to the plurality of curved surfaces 13a. Thus, the light emitted from each of the plurality of line light sources 12 can totally reflect without leak light directly passing through to the outside of the light source device 10.

Figure 9:
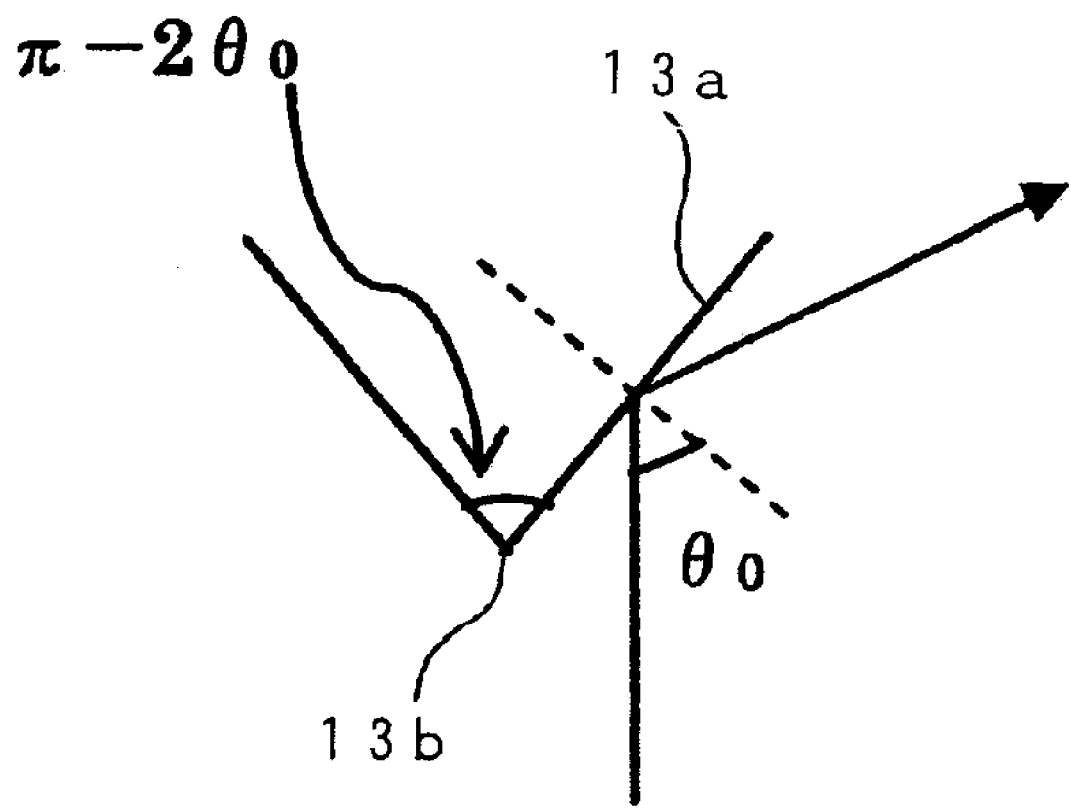
FIG. 9 is a schematic cross-section view depicting a total reflection near an apical segment of a curved shape of a light guide in the surface light source device shown in FIG. 1.

Each specific angle of base lines 13b of the light guide 13 will now be given. FIG. 9 is a schematic cross-section view depicting a total reflection near each base line 13b of the plurality of two-dimensional curved surfaces 13a of the light guide 13 in the surface light source device 10 shown in FIG. 1. Each angle of base lines 13b of the plurality of two-dimensional curved surfaces 13a is narrower than $(\pi-2\theta_0)$ in view of the above-described critical angle $\theta_0$ in order to totally reflect the light that is emitted upwards from each of the plurality of line light sources 12 without exception as shown in FIG. 9.

Thus, when the light guide 13 is composed of an acrylic resin having a refractive index of 1.49, because the critical angle $\theta_0$ is 42.16 degrees as described above, each angle of the base lines 13b is narrower than 95.68 degrees. When the incoming angle $\theta$ is defined as 45 degrees, each angle of the base lines 13b can be defined as 90 degrees.

In addition, each width of the plurality of two-dimensional concave channels 13c can be wider than each diameter D of the plurality of line light sources 12. Each top angle of the channels 13c can be formed at 90 degrees. Therefore, the light emitted upwards from each of the plurality of line light sources 12 and which also enters into each of the plurality of two-dimensional concave channels 13c can totally reflect on each of the plurality of two-dimensional curved surfaces 13a and can diffuse in both sidewards directions.

Furthermore, when the differential equation of formula 4 is resolved, the right overhead point (0, 7) can be substituted as the initial condition. In this case, if the "y" point (7) becomes smaller in value, which means a low point, the light guide 13 can be formed thinner. However, if the "y" point becomes too small, each of the base lines 13b may become too low, and each of the thickness dimensions between the plurality of base lines 13b and the plurality of two-dimensional concave channels 13c decreases. Therefore, because it is difficult to form the light guide 13 in such a thin manner, the "y" point may be defined such that each thickness between the plurality of base lines 13b and the plurality of two-dimensional concave channels 13c is thicker than at least 2 mm.

According to the above-described exemplary embodiments of the disclosed subject matter, the light emitted from each of the plurality of line light sources 12 can totally reflect on each of the plurality of two-dimensional curved surfaces 13a of the light guide 13 in both sidewards directions. The respective light that is totally reflected on each of the plurality of two-dimensional curved surfaces 13a can be mixed adequately with respect to each other and therefore the illuminating light emitted upwards by transmitting through the plurality of curved surfaces 13a can be prevented from including an irregular brightness, an irregular color and the like.

In addition, because the plurality of line light sources 12 can emit linear light continuously in the Y direction, the irregular brightness in the Y direction can be prevented and the decrease of brightness in the X direction can be also prevented due to the plurality of line light sources 12. Thus, the disclosed subject matter can provide the surface light source device having a high brightness and uniform brightness on the whole.

In the above-described exemplary embodiments, the surface light source device can be rectangular in a top view. However, this shape can be varied greatly and remain within the spirit and scope of the disclosed subject matter. For example, this shape in a top view can be configured to have a polygonal surface, non-symmetrical surface, oval surface or other surface by varying each of the plurality of line light sources and other structures.

In addition, the diffusing plate 14 can be located on the light guide 13, the diffusing sheet 15 can be located on the diffusing plate 14 and the prismatic sheet 16 can be located on all of the above. Also, the diffusing reflection film 17 can be located on the circuit board 11. However, it is contemplated that the light diffusing member and the light condensing member can be formed in various other shapes and configurations without limitation. The above-described member can be eliminated according to the usage and the like of the surface light source device.

Furthermore, the surface light source device of the exemplary embodiment can be configured for use as a light source of a back light unit in a LCD unit for use in a television, a personal computer, display devices, etc. In these cases, the LCD unit can be configured to locate the surface light source device in the rear of a LCD panel. The plurality of line light sources can be a plurality of cold cathode fluorescent lamp (CCFL), because a CCFL can enjoy a long life at low power.

While a circuit board 11 is disclosed as being planar and with conductive patterns located in a planar surface of the circuit board 11, the housing structure can be configured in other and different ways, instead of with the planar circuit board 11. For example, a power source can be provided to the light sources via different means other than a circuit board, and the housing structure or circuit board can be angled, stepped, curved, etc.

According to the above-described structure, the number of the CCFLs and size of the CCFLs and the light guide can be voluntarily selected in accordance with the size of the LCD unit and in accordance with the desired brightness. Thus, the LCD unit using the surface light source device can display an arbitrarily large area with high brightness and uniform brightness.

However, these surface light source devices can also be configured for use as other light sources, such as for flat lighting and the like, without departing from the spirit and scope of the presently disclosed subject matter. While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. A surface light source device comprising:
    a circuit board including at least one conductive pattern thereon;
    a plurality of line light sources positioned substantially parallel with respect to each other and located adjacent the circuit board and the conductive pattern, each of the light sources configured to emit light along a light emitting axis that is substantially perpendicular to the circuit board; and
    a light guide including a top surface and a bottom surface, the plurality of line light sources located closer to the bottom surface than the top surface and between the light guide and the circuit board, the top surface of the light guide including a plurality of two-dimensional curved surfaces configured to each have a base line comprised of portions that are closest to the circuit board as compared to other portions of each respective two-dimensional curved surface, each base line extending substantially parallel with a respective one of the plurality of line light sources and intersecting with the light emitting axis of the respective one of the plurality of line light sources, and each of the base lines being connected to a surface of the plurality of two-dimensional curved surfaces which curves upwards and away from each respective base line, the bottom surface of the light guide being configured to receive light emitted from each of the plurality of line light sources, wherein the plurality of two-dimensional curved surfaces are configured to totally reflect light directly incident on the plurality of two-dimensional curved surfaces from each of the plurality of line light sources.

2. The surface light source device according to claim 1, wherein the bottom surface of the light guide is configured with a plurality of two-dimensional concave channels in which at least a respective one of the plurality of line light sources is disposed, and the plurality of two-dimensional concave channels are configured to each have a top line intersecting with a respective light emitting axis of the plurality of line light sources.

3. The surface light source device according to claim 2, wherein each of the plurality of two-dimensional concave channels is configured in an inverted v-shaped configuration.

4. The surface light source device according to claim 1, wherein the bottom surface of the light guide defines a plurality of two-dimensional concave voids between adjacent line light sources of the plurality of line light sources.

5. The surface light source device according to claim 2, wherein the bottom surface of the light guide defines a plurality of two-dimensional concave voids between adjacent line light sources of the plurality of line light sources.

6. The surface light source device according to claim 3, wherein the bottom surface of the light guide defines a plurality of two-dimensional concave voids between adjacent line light sources of the plurality of line light sources.

7. The surface light source device according to claim 1, further comprising:
    at least one of a light diffusing member and a light condensing member, wherein the at least one of a light diffusing member and a light condensing member is mounted on the light guide.

8. The surface light source device according to claim 2, further comprising:
    at least one of a light diffusing member and a light condensing member, wherein the at least one of a light diffusing member and a light condensing member is mounted on the light guide.

9. The surface light source device according to claim 3, further comprising:
    at least one of a light diffusing member and a light condensing member, wherein the at least one of a light diffusing member and a light condensing member is mounted on the light guide.

10. The surface light source device according to claim 4, further comprising:
    at least one of a light diffusing member and a light condensing member, wherein the at least one of a light diffusing member and a light condensing member is mounted on the light guide.

11. The surface light source device according to claim 1, further comprising:
    at least one reflecting member mounted on the circuit board.

12. The surface light source device according to claim 7, further comprising:
    at least one reflecting member mounted on the circuit board.

13. The surface light source device according to claim 9, further comprising:
    at least one reflecting member mounted on the circuit board.

14. A liquid crystal display unit including the surface light source device according to claim 1, comprising:
    a liquid crystal display located on the surface light source device, wherein the plurality of line light sources includes at least one cold cathode fluorescent lamp.

15. A liquid crystal display unit including the surface light source device according to claim 2, comprising:
    a liquid crystal display located on the surface light source device, wherein the plurality of line light sources includes at least one cold cathode fluorescent lamp.

16. A liquid crystal display unit including the surface light source device according to claim 11, comprising:
    a liquid crystal display located on the surface light source device, wherein the plurality of line light sources includes at least one cold cathode fluorescent lamp.

17. A light source device configured to direct light in a light emitting direction, comprising:
    a housing structure including a housing surface that faces in the light emitting direction;
    a light guide having a bottom surface located adjacent to and facing the housing surface, and having a top surface located further from the housing surface than the bottom surface, the light guide having a thickness defined between the top surface and bottom surface and a length extending orthogonal to the thickness and from at least one side surface to an opposite side surface of the light guide; and
    a plurality of elongate light sources each extending along at least a substantial portion of the length of the light guide and along a respective longitudinal axis of each of the plurality of light sources, the plurality of elongate light sources located between the housing structure and the light guide, wherein
    the top surface of the light guide includes a plurality of convex surfaces separated from each other by a plurality of troughs, each of the troughs extending substantially in parallel with the longitudinal axis of a respective elongate light source, and each of the troughs being substantially centered as viewed from the light emitting direction over the longitudinal axis of a respective elongate light source.

18. The surface light source device according to claim 17, wherein the bottom surface of the light guide includes a plurality of channels in which at least a respective one of the plurality of light sources is disposed.

19. The surface light source device according to claim 18, wherein each of the plurality of channels is configured in an inverted v-shaped configuration.

20. The surface light source device according to claim 17, wherein the bottom surface of the light guide includes a plurality of concave voids located between adjacent light sources of the plurality of light sources.

* * * * *